Figure 1:
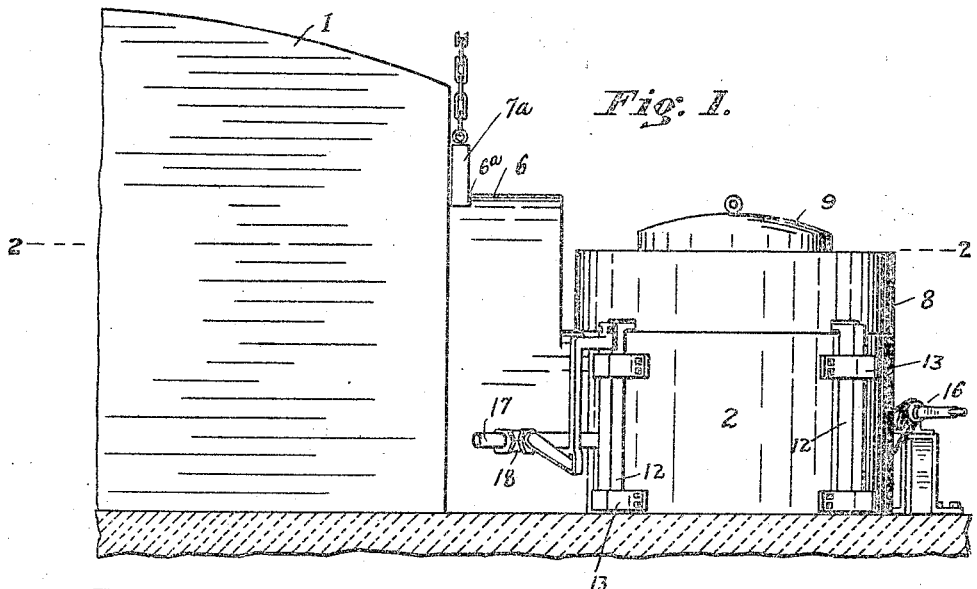

W. W. W. KEYES.
GLASS MELTING MEANS.
APPLICATION FILED MAR. 19, 1910.

1,000,921.

Patented Aug. 15, 1911.

4 SHEETS—SHEET 1.

WITNESSES:
Harold P. Haynes.
Fred W. Mullin

INVENTOR
WILLIAM W. W. KEYES.

BY
Thomas J. Ryan
ATTORNEY.

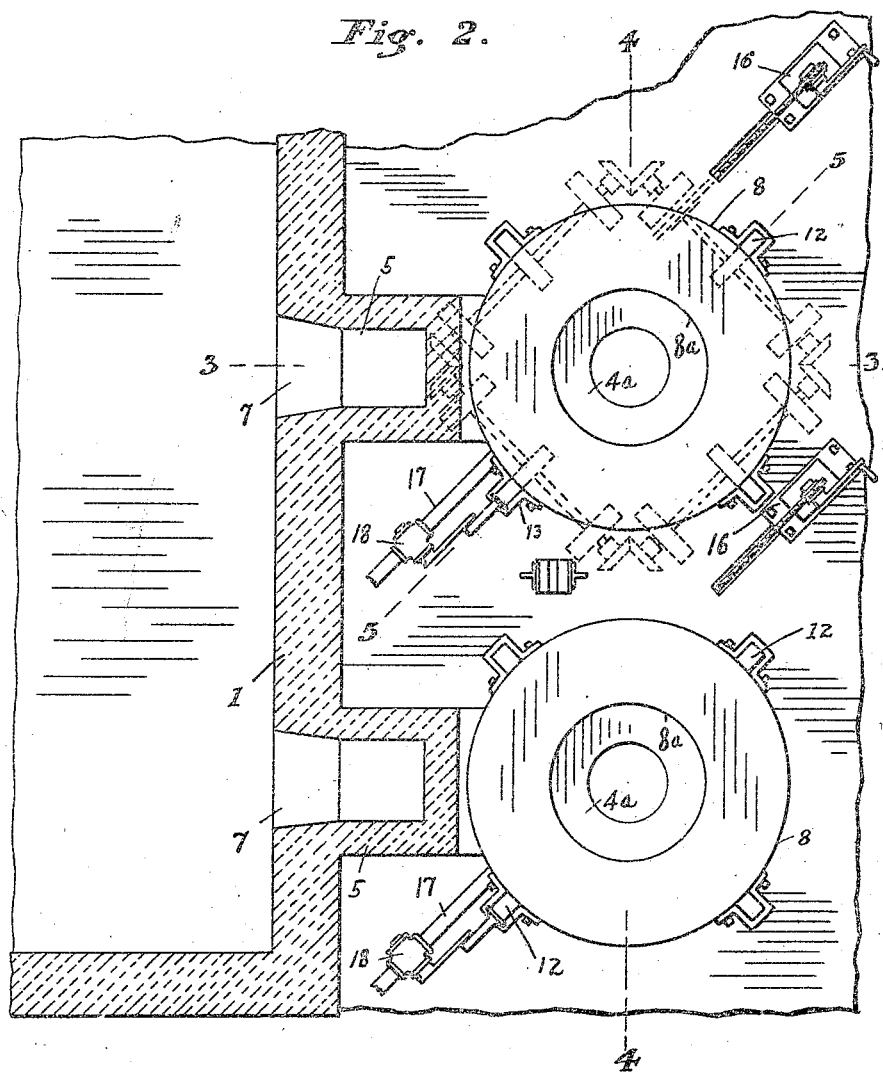

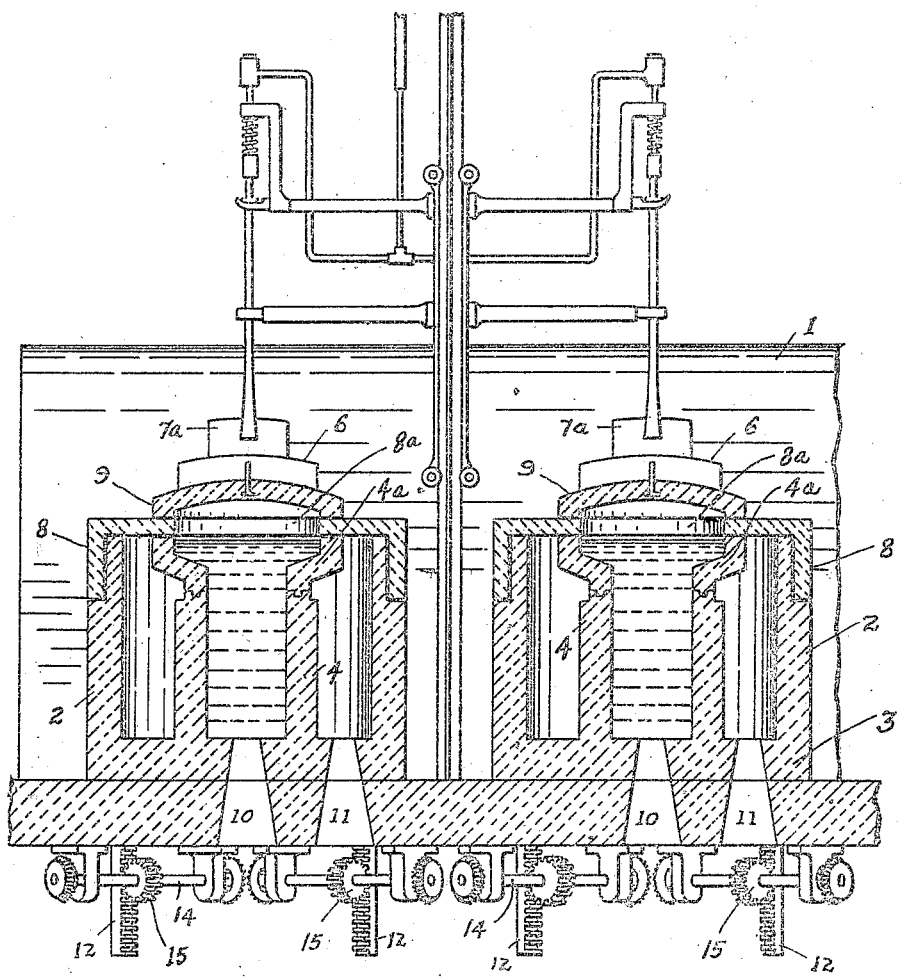

W. W. W. KEYES.
GLASS MELTING MEANS.
APPLICATION FILED MAR. 19, 1910.

1,000,921.

Patented Aug. 15, 1911
4 SHEETS—SHEET 4.

WITNESSES:

INVENTOR
WILLIAM W. W. KEYES,
BY
ATTORNEY

UNITED STATES PATENT OFFICE.

WILLIAM W. W. KEYES, OF ALEXANDRIA, INDIANA, ASSIGNOR OF ONE-HALF TO CHARLES DORN, OF ARNOLD, PENNSYLVANIA.

GLASS-MELTING MEANS.

1,000,921.  Specification of Letters Patent.  Patented Aug. 15, 1911.

Application filed March 19, 1910. Serial No. 550,439.

*To all whom it may concern:*

Be it known that I, the undersigned, WILLIAM W. W. KEYES, a citizen of the United States, residing at Alexandria, in the county of Madison and State of Indiana, have invented certain new and useful Improvements in Glass-Melting Means, of which the following is a specification.

This invention relates to improvements in means for melting glass.

It is well known that in the working of glass, the consistency of same in its extent from the melting end of the tank to the other end is sufficiently variable that in the gathering out for the purposes of drawing same into form for ultimately making sheet glass, it is necessary that the quota of glass so gathered shall be re-heated and brought up to the proper condition for drawing. Various means have been employed for this purpose, including pots carried in kilns that are moved up to a mouth in the melting tank; the pot after having received the gather being then moved to a distant station where, after being re-heated, the draw is accomplished. In this and other methods with which I am familiar the successful handling of the gather involves the exercise of great skill, and moreover there is always a considerable portion of the glass so gathered that is left after each gather and which has to be either thrown away or worked over. In the practice of this department of glass making for production of the heavier sheet glass it is not infrequently the case that from a gather of say four hundred pounds of glass, only about one fourth of same would be utilized in the draw.

It is to render possible the handling of glass in such improved manner that the drawing of same may be accomplished economically and reliably and with the exercise of the minimum amount of labor and skill, that I have developed the present invention.

The preferred form combination and arrangement of parts for carrying my invention into effect are shown in the accompanying drawings, wherein corresponding parts throughout the several views are indicated by similar characters of reference.

Figure 3:
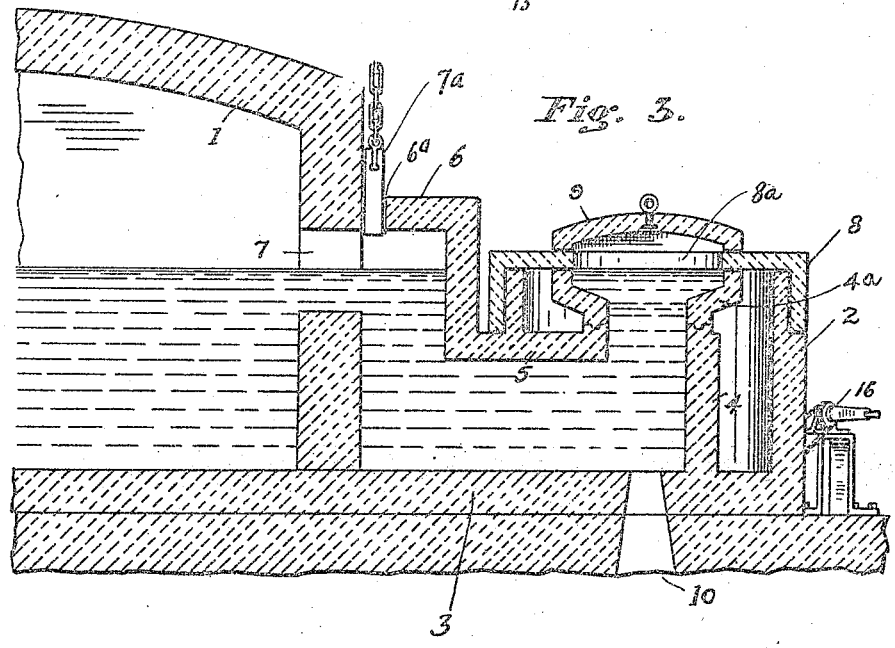
Figure 5:
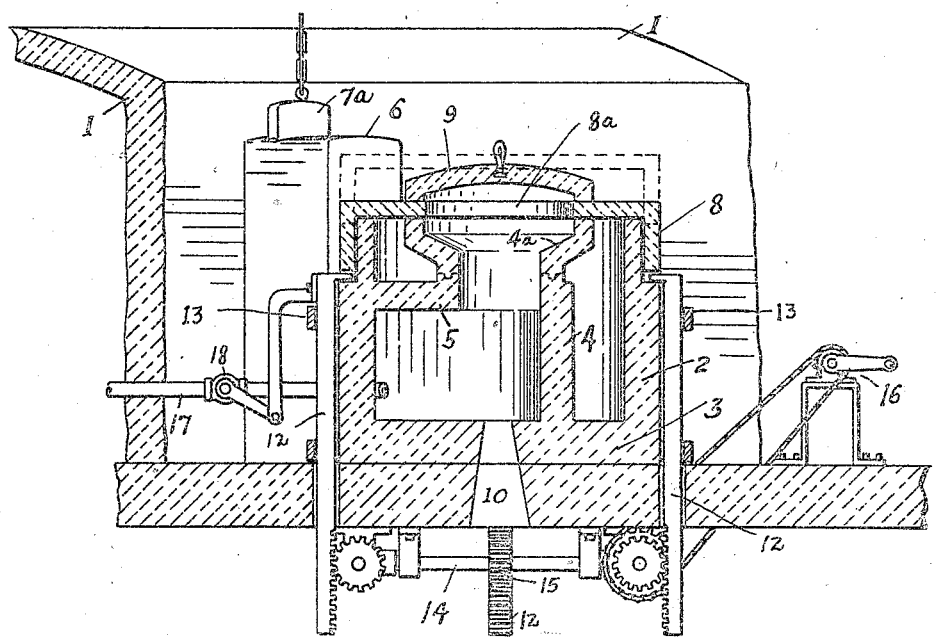

Figure 1, is a side view of my improved glass melting means. Fig. 2, is a sectional plan view taken on the line 2—2 in Fig. 1. Fig. 3, is a vertical transverse sectional view taken on the line 3—3 in Fig. 2. Fig. 4 is a vertical longitudinal sectional view taken on the line 4—4 in Fig. 2. Fig. 5, is a vertical transverse sectional view taken on the line 5—5 in Fig. 2.

At a location adjacent to the melting tank 1 is a kiln 2 built up from the floor or base 3 which has a level the same as that of the floor of the tank. From one side of the pot 4 which is located centrally in this kiln extends a tunnel 5, the roof 6 thereof rising to such height and joining the wall of the tank in such a manner that the under side of the roof will be at a suitable height above the level of the molten glass which will flow from the tank through the opening 7 and into the tunnel 5 and pot 4. Through a slot 6ª a damper door 7ª may be operated by raising or lowering of same by suitable means (not shown). By this means the amount of heat passing through the opening 7 may be regulated. The pot 4 has its top portion of flared form, the flared edges being affected by the heat contained in the kiln, as will be presently referred to. The preferable form of construction of this pot is that shown in the drawings, the flared top portion 4ª being made in the form of a ring capable of being set and retained in correct position on the main portion of the pot.

The cover portion 8 of the kiln and which is capable of being raised and lowered, has the central opening 8ª, and when in lowered position the kiln will be closed thereby. The lid 9 which is capable of being removed from and replaced in position over the opening 8ª, by suitable means (not shown) rests upon the cover portion 8 of the kiln. The openings 10 and 11 from the bottom of the pot and from the kiln are closed by the usual suitable stopper blocks.

For the purpose of raising the cover portion 8 I provide the racks 12 which may move slidingly in the guide blocks 13. The shafts 14 suitably geared together and journaled in the boxings disposed underneath the kiln carry the pinions 15 which move the said racks. These shafts may be operated by a windlass 16.

17 is a conduit which conveys the gas fuel into the kiln. A valve 18 in this conduit is arranged with such connections that the flow of fuel into the kiln may be regulated and controlled. In this embodiment of my invention wherein I contemplate the use of gas as the fuel for the kiln, the regulation of the flow of the fuel will obtain the desired effect in the kiln. If heat from another kind of fuel would be used then the flow of the heat would be controlled by dampers or other suitable means. These kilns are built up in a line or series along and in combination with the walls of the melting tank 1. By reason of the improved results obtained in presenting the surface of glass of proper consistency to be drawn, my invention renders possible the much more effective use of drawing machinery. To supplement the description hereinafter of how this is accomplished there is shown in Fig. 4 a skeleton view of glass drawing machinery capable of drawing from the pot the charge of glass and then the blowing of same into the form of the cylinder that is ultimately to be finished into sheet form.

The cover portion 8 of the kiln will normally occupy the lowered and closed position as shown in the drawings. The latent heat of the glass in the main tank will be held by the glass that fills the pot; the correct temperature of the glass in the pot being maintained by the heat in the kiln. With the removal of the lid 9 the heat is shut off from the kiln. The blow-pipe is lowered into the glass and with the raising of same the drawing and blowing of the glass into the usual cylindrical form is accomplished. After the cylinder has been severed from the supply in the pot, the lid 9 is replaced and the cover portion 8 is raised to the dotted line position shown in Fig. 5, the heat being again supplied to the kiln. After a suitable interval of time the cover portion 8 is lowered to within a short distance of the top of the pot, the heat having been turned off again. Then the lid 9 is removed, and by manual means, the surface of the glass in the pot is skimmed, the refuse being pushed over the edges of the pot will fall to the floor of the kiln and may be taken away through the openings 11. The cover portion 8 is then raised to full height, as shown by the said dotted line position, the heat being again turned on and the re-heating or "melting back" of the glass to condition for drawing, takes place. When this re-heating has progressed a sufficient length of time, the cover portion 8 is again lowered and the heat shut off, the glass being in condition to be drawn.

In the practice of my invention there is slight if any variation in temperature of the glass except at its surface so that uniform consistency of the glass will be maintained. It being possible to draw from one pot while the glass in another pot is being re-heated, the necessity of the glass-drawing machinery being rendered temporarily out of use is avoided. All expense of ladling of glass or attendance to removable pots or kilns is avoided, and the amount of slag or skimmings will be reduced to a minimum.

What I claim as my invention and desire to secure by Letters Patent, is—

1. A glass melting apparatus comprising a tank, a kiln capable of having the heat controlled therein independently, a pot in said kiln and having a passageway leading from the tank, a flared and raised top portion for said pot, a cover portion to close the space between the rim edge of the pot and the kiln and capable of being raised and lowered the said cover portion having a central opening therein to register with the rim edge of the pot and being provided with vertical flange to engage the outer face of the wall of the kiln, a removable lid for said cover portion.

2. A glass melting apparatus comprising a tank, a kiln capable of having the heat controlled therein independently, a pot in said kiln and having a passageway leading from the tank, a flared and raised top portion for said pot, a cover portion to close the space between the rim edge of the pot and the kiln and having a central opening to register with the rim edge of the pot and being provided with a vertical flange to engage the outer face of the rim of the kiln, means to raise and lower the cover-portion and to sustain it at different raised and lowered positions, a removable lid to cover the opening in said cover portion.

3. A glass melting apparatus, comprising a tank, a kiln capable of having the heat controlled therein independently, a pot in said kiln and having a passageway leading from the tank, a flared top portion for said pot, a cover portion to close the space between the rim edge of the pot and the rim edge of the kiln and having a central opening to register with the rim edge of the pot and being provided with a vertically disposed flange to engage the face of the wall of the said kiln, means to raise and lower the cover portion and to sustain it at different raised and lowered positions including racks arranged vertically of the kiln and having their upper ends to engage the cover portion, gearing to raise and lower said racks and to sustain same at varied heights.

In testimony whereof I hereunto affix my signature in presence of two witnesses.

WILLIAM W. W. KEYES.

Witnesses:
 DEE R. JONES,
 BENJ. FISHER.